Jan. 18, 1966　　　　H. HURLEY　　　　3,229,885
SOLDER-FEEDING APPARATUS FOR A SOLDERING IRON
Filed April 27, 1964　　　　　　　　　　　　2 Sheets-Sheet 1
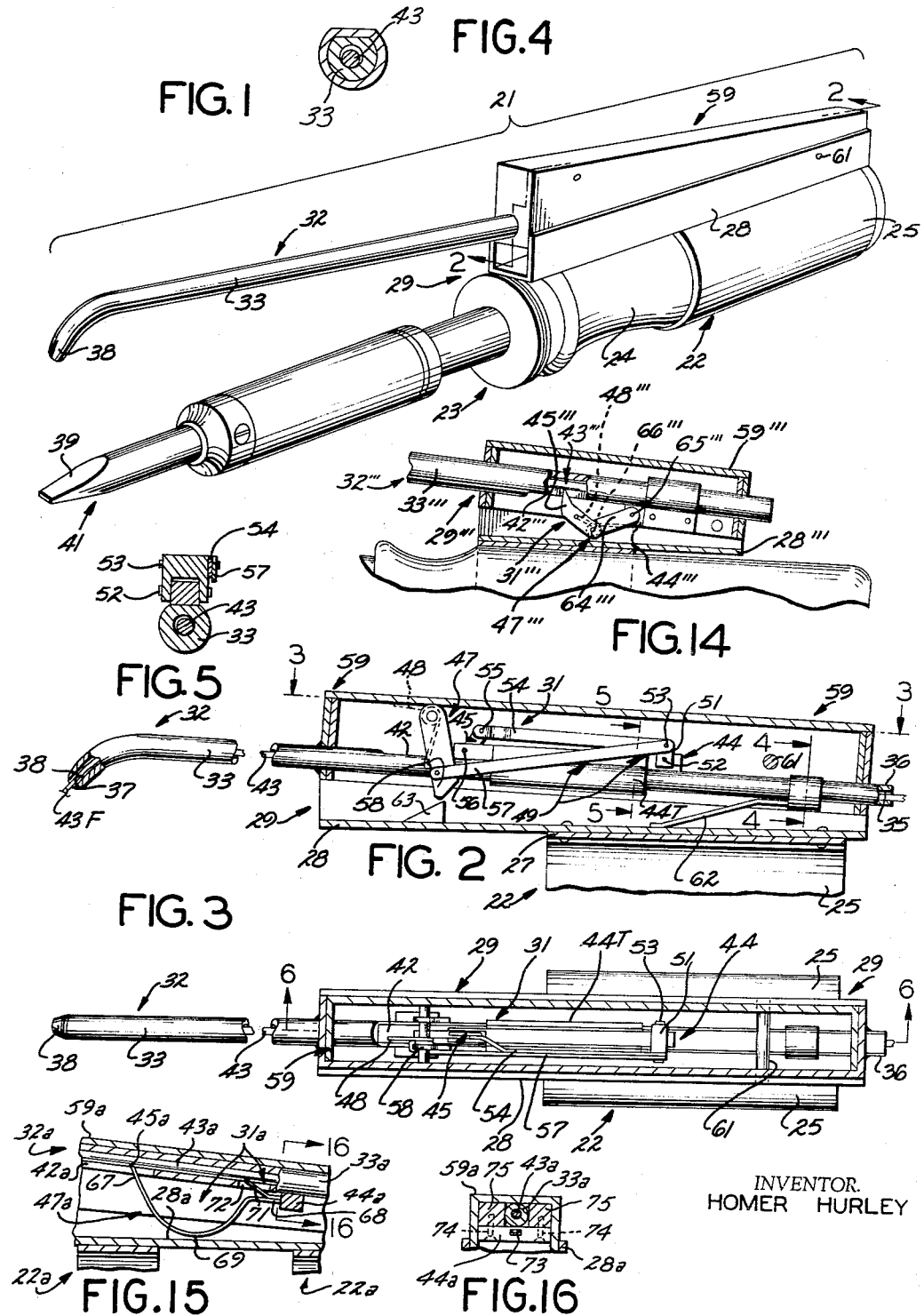
INVENTOR.
HOMER HURLEY

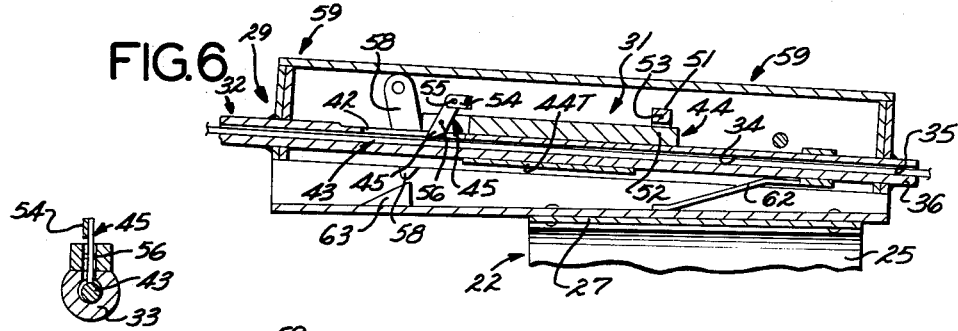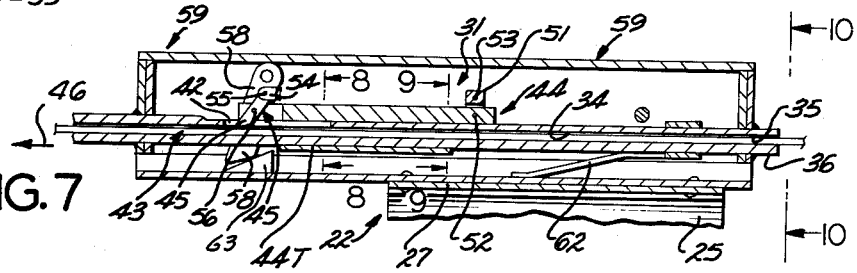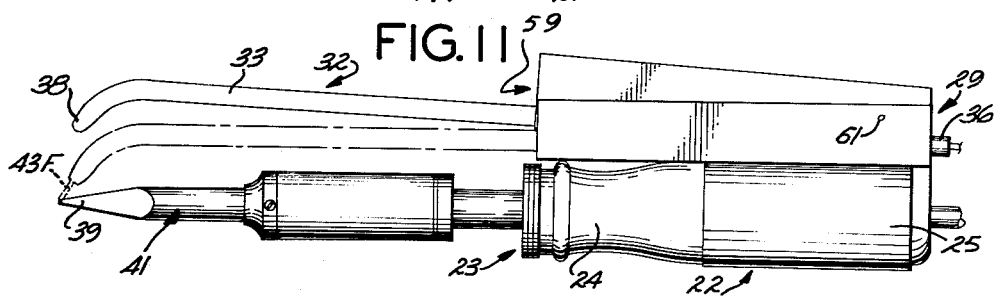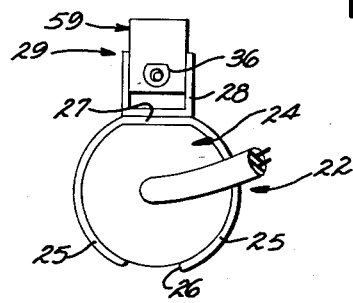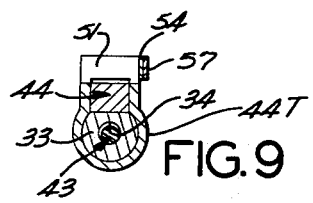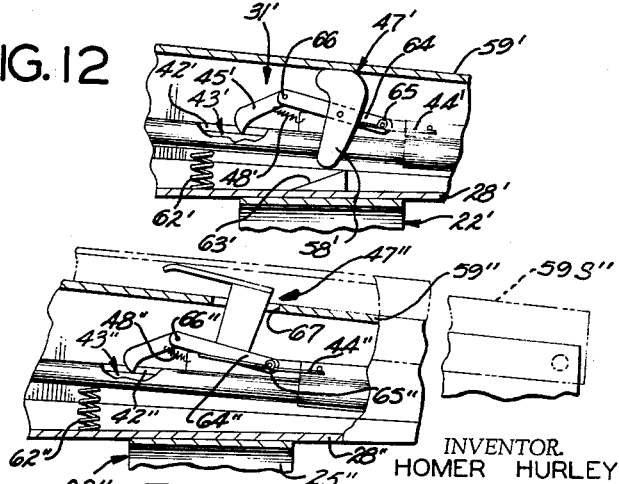

United States Patent Office 3,229,885
Patented Jan. 18, 1966

3,229,885
SOLDER-FEEDING APPARATUS FOR A SOLDERING IRON
Homer Hurley, 1221 N. Vermont Ave., Los Angeles 29, Calif.
Filed Apr. 27, 1964, Ser. No. 362,775
10 Claims. (Cl. 228—52)

Generally speaking, the present invention relates to the soldering iron art and, more particularly, relates to apparatus which can be in the form of an attachment adapted to be mounted on a pre-existing soldering iron or adapted to be initially supplied in such mounted relationship with respect to a soldering iron at the time of manufacture thereof and which effectively comprises means for controllably feeding a length of solder through a solder guide and out of a dispensing tip which can be controllably moved into closely adjacent relationship with respect to the heated tip end of the soldering iron whereby to facilitate one or more soldering operations.

Upon completion of such a soldering operation, said dispensing tip can be effectively moved away from the heated tip of the soldering iron so as to be out of the way and also so as to minimize the absorption of heat by said solder-dispensing tip and the solder contained therein. This latter feature is quite important since multiple soldering operations would tend to cause excessive and undesirable heating of the solder-dispensing tip if it were not movable away from the heated soldering iron tip in between soldering operations and this would tend to heat the solder ultimately to an elevated temperature which might tend to interfere with effectively dispensing same through the dispensing tip.

Furthermore, the movement of the solder-dispensing tip away from the heated tip end of the soldering iron makes it possible to apply said heated tip of the soldering iron to various relatively inaccessible locations which would otherwise be difficult or impossible to reach if the solder-dispensing tip remained at all times in closely laterally adjacent relationship with respect to the heated tip end of the soldering iron.

Incidentally, it should further be noted that both of the above-mentioned movements are effectively coupled together in the novel apparatus of the present invention in a manner such that movement of the dispensing tip, which dispenses the solder, toward the heated tip end of the soldering iron operates novel solder-advancing means for moving the front end of a length of solder toward said heated tip end of the soldering iron. In other words, it is not necessary to independently manually operate the solder-advancing means. All that is required is to move the dispensing tip toward the heated soldering iron, and the solder-advancing means effectively coupled thereto is appropriately operated in a solder-advancing and dispensing manner.

It is an object of the present invention to provide a novel solder-feeding apparatus of the character referred to above which is adapted for mounting in closely adjacent relationship with respect to a soldering iron and wherein a portion of the apparatus is controllably movably mounted for movement of a solder-dispensing tip of a solder guide means between a relatively remote transversely displaced position with respect to the heated tip end of a solder iron into a closely adjacent position with respect thereto and for simultaneously operating a novel solder-advancing and dispensing means for dispensing a desired forward portion of a length of solder toward said heated tip end of said soldering iron for the effective heating of same and use of same for performing an effective soldering operation.

It is a further object of the present invention to provide apparatus of the character referred to in the preceding object including biasing means normally effectively biasing said solder-dispensing tip into said remote displaced position with respect to said heated soldering iron tip for forcible manual movement thereof into said closely adjacent relationship only when desired.

It is a further object to provide apparatus of the character referred to above wherein the solder-advancing means is also normally effectively biased into a pre-operated or pre-operative relationship until such time as said solder-dispensing tip is forcibly moved into said closely adjacent relationship with respect to said heated soldering iron tip end and said effectively coupled or connected solder-advancing means is correspondingly operated in a solder-advancing manner.

It is a further object of the present invention to provide a novel solder-feeding apparatus of the type referred to above which can be initially manufactured and supplied to a prospective user in mounted relationship with respect to a soldering iron or which can be manufactured and supplied to a potential user as a separate attachment which can be controllably attached to a pre-existing conventional soldering iron.

It is a further object of the present invention to provide a novel solder-feeding apparatus of the type referred to above in any or all of the various generic and/or specific aspects mentioned above.

It is a further object of the present invention to provide solder-feeding apparatus of the character referred to hereinbefore which is of relatively simple, inexpensive, easy-to-manufacture, easy-to-mount, easy-to-use construction such as to greatly improve the efficiency of soldering operations and such as to be conducive to widespread usage of the apparatus.

Further objects are implicit in the detailed description which follows hereinafter (which is to be considered as exemplary of the invention but not specifically limiting it) and said objects will be apparent to persons skilled in the art after a careful study of the detailed description which follows hereinafter.

For the purpose of clarifying the nature of the present invention, several exemplary embodiments are illustrated in the hereinbelow-described figures of the accompanying two sheets of drawings.

FIG. 1 is a perspective view illustrating one illustrative embodiment of the present invention in mounted relationship with respect to a conventional type soldering iron. In this view the forward dispensing tip end of the solder-feeding means is shown in its normal substantially laterally displaced relationship with respect to the forward tip end of the soldering iron which is adapted to be heated.

FIG. 2 is an enlarged, fragmentary, partly broken away view, partly in section and partly in elevation, taken in the direction of the arrows 2—2 of FIG. 1.

FIG. 3 is a view taken in the direction of the arrows 3—3 of FIG. 2.

FIG. 4 is an enlarged fragmentary cross-sectional view taken in the direction of the arrows 4—4 of FIG. 2, with all other portions of the apparatus behind the plane of the section removed for reasons of drawing simplification and clarity.

FIG. 5 is an enlarged fragmentary cross-sectional view taken in the direction of the arrows 5—5 of FIG. 2, with all other parts of the apparatus behind the plane of the section removed for reasons of drawing simplification and clarity.

FIG. 6 is an enlarged fragmentary sectional view taken in the direction of the arrows 6—6 of FIG. 3, with the inwardly movable portion of the apparatus carrying the solder guide means and with the solder-advancing means being shown in their normal at-rest pre-operated or pre-operative positions.

FIG. 7 is a view similar to FIG. 6 but shows the apparatus after forcible inward manual actuation thereof from the outer pre-actuation position into the inner fully actuated and after-advancement position.

FIG. 8 is an enlarged fragmentary cross-sectional view taken in the direction of the arrows 8—8 of FIG. 7, with all other parts of the apparatus behind the plane of the section removed for reasons of drawing simplification and clarity.

FIG. 9 is an enlarged fragmentary cross-sectional view taken in the direction of the arrows 9—9 of FIG. 7, with all other parts of the apparatus behind the plane of the section removed for reasons of drawing simplification and clarity.

FIG. 10 is a rear elevational view taken in the direction of the arrows 10—10 of FIG. 7 illustrating the solder-feeding attachment means and the handle portion of the pre-existing conventional soldering iron and clearly showing the mounting of said solder-feeding attachment means with respect to said soldering iron handle.

FIG. 11 is a side evelational view of the solder-feeding apparatus of the present invention, and the soldering iron upon which it is mounted, as seen from the same side as FIG. 2, the difference being that FIG. 2 is partly in section, while FIG. 11 is in full elevation. Additionally, FIG. 11 illustrates the two different extreme positions of the solder guide means and the forward dispensing tip end thereof, it being shown in solid or full lines in its normal position of maximum displacement and being shown in broken lines in its inwardly forcibly moved relationship where said solder-dispensing tip end is in very closely laterally adjacent relationship with respect to the forward tip end of the soldering iron, which is adapted to be heated during a soldering operation.

FIG. 12 is a fragmentary view, partly in elevation and partly in section, of a slightly modified form of the solder-advancing means and the adjacent portions of the inwardly movable outer housing structure which carries the inwardly displaceable solder guide means. This view also illustrates a slightly modified form of biasing spring means for said elements adapted to return them to pre-operative relative positions. Furthermore, this view illustrates a modified form of attachment or clamping means for fastening the entire structure to a soldering iron handle.

FIG. 13 is a fragmentary view illustrating a very slight variation of a modified form of the invention shown fragmentarily in FIG. 12.

FIG. 14 is a fragmentary, partially broken away view illustrating a slight variation of the modified form of the invention shown fragmentarily in FIG. 13 and might be said to substantially comprise a reversed arrangement of the solder-advancing means thereof with respect to the solder guide tube means and with respect to the handle of the soldering iron means which thus makes it possible to eliminate the operating lever and the auxiliary cover means of FIG. 13.

FIG. 15 is a fragmentary, partially broken-away view generally similar to FIG. 14 but illustrating a further modification of the solder-advancing means.

FIG. 16 is a fragmentary cross-sectional view, taken in the direction of the arrows 16—16 of FIG. 15.

Generally speaking, the solder-feeding apparatus of the present invention is shown in the one exemplary form in FIGS. 1–11 wherein it comprises an attachment apparatus, indicated generally at 21 in FIG. 1, adapted to be attached by attachment means, one exemplary (but non-specifically limiting) form of which is indicated generally at 22, with respect to a pre-existing soldering iron such as is indicated generally at 23.

In the specific example illustrated in said figures, the conventional soldering iron, indicated generally at 23, is provided with a handle 24 and the attachment means, indicated generally at 22, comprises what might be termed a split resilient C-clamp structure formed by the two elements 25 separated at the lower end by the slot 26 and adapted to resiliently receive therebetween said soldering iron handle 24 whereby to rigidly mount the entire solder-feeding attachment means 21 with respect to the soldering iron 23.

However, various other types of attachment means are intended to be included and comprehended within the broad scope of the present invention, and an arrangement wherein it is effectively initially manufactured in pre-mounted relationship is also contemplated and is intended to be included and comprehended within the scope of the invention.

In the specific example illustrated in FIGS. 1–11, said clamp means 22 carries along the top surface 27 thereof what may be termed a base portion 28 of a housing means, generally indicated at 29, which is adapted to contain therein manually or digitally operable solder-advancing means, one exemplary and non-specifically limiting form of which is generally designated by the reference numeral 31, as is best shown in FIGS. 2, 3, 6 and 7.

Said housing means 29 is also adapted to carry, in a manner longitudinally passing therethrough, a solder guide means, one exemplary but non-specifically limiting form of which is generally indicated at 32, which is shown as comprising a longitudinal hollow tube means 33 defining a longitudinal guide aperture 34 extending from an entry opening 35 carried by rear entry end 36 thereof to an exit opening 37 carried by a forward dispensing tip end 38 of the solder guide means 32.

It will be noted that said forward dispensing tip end 38 of said solder guide means 32 is shown in one exemplary but non-specifically limiting form wherein it is angularly forwardly and inwardly directed toward the forward tip end 39 of the soldering iron element 41 which is adapted to be heated by conventional electrically energizable heating means (not shown since such are well known in the art and comprise no part of the present invention).

It should further be noted that said housing means 29 mounts said solder guide tube means 32 and the forward dispensing tip end 38 thereof for movement between two extreme positions as clearly shown in FIG. 11. One of said extreme positions is shown in solid or full lines in FIG. 11 and comprises a normal, non-dispensing, maximum-lateral-displacement position of said solder guide tube means 32. Said solder guide tube means 32 and said dispensing tip 38 thereof are shown in broken lines in FIG. 11 in an inner extreme use position such as it assumes when a length of solder is to be controllably fed toward the heatable tip 39 of the solder iron element 41 for use during an actual soldering operation. The structure of the housing 29 which provides for this controllable movement of the solder guide tube means 32 between said two extreme positions, as shown in FIG. 11, will be described in greater detail hereinafter.

A portion of said solder guide tube means 32 which lies within the housing means 29 is provided with access opening means, as indicated at 42 in FIGS. 2, 3, 6 and 7, for providing access to at least one side of said longitudinal solder guide aperture means 34 and, therefore, to a corresponding surface part of a length of solder, such as is indicated at 43, so that the solder-advancing means, indicated generally at 31 in FIGS. 2, 3, 6, and 7, can be moved into actual engagement with said portion of said length of solder 43 for advancing same in one or more steps corresponding to the operation of said solder-advancing means 31.

In the specific example illustrated for exemplary purposes in FIGS. 1–11, said solder-advancing means 31 is shown in one specific form wherein it comprises longitudinal slide means, indicated generally at 44, effectively slidably mounted with respect to a portion of the longitudinal solder guide tube means 32 and rearwardly of, but closely adjacent to, said access opening means 42, with said longitudinal slide means 44 being provided with downwardly angularly forwardly inclined engagement tooth means 45 pivotally mounted with respect thereto for movement between a rear disengaged position (as shown in FIG. 6) with respect to the engageable portion of the length of solder 43 accessible through the access opening means 42 and a second engaged position with respect to said length of solder 43 for forward movement thereof as the slide means 44 is forcibly forwardly slidably moved (see FIG. 7). This above is best shown in FIG. 6, where said slide member 44 and the engagement tooth 45 are shown in said disengaged positions, and in FIG. 7 where said slide member 44 and the tooth 45 are shown in leftwardly displaced engaged positions relative to said length of solder 43 whereby to effect a leftwardly advancing movement of said length of solder 43 in the direction of the arrow 46 of FIG. 7.

The above-described solder-advancing action is brought about by forcible manual or digital movement of the entire solder guide tube means 33 of the solder-advancing means 31 and a movable top or outer portion 59 of the housing 29, within which said elements are mounted, for the purpose of moving inwardly the solder-dispensing tip 38 toward the heated soldering iron tip end 39. In other words, the above-described solder-advancing action is brought about as a result of such forcible manually effected inward movement of the dispensing tip end 38 of the solder guide tube means 33 from the solid line position shown in FIG. 11 into the broken line position shown in FIG. 11 whereby to simultaneously advance the solder and bring it into close transverse juxtaposition with respect to the heated soldering iron tip end 39.

The above is made possible by reason of the fact that the solder guide tube means 33 and the solder-advancing means 31 are effectively pivotally movably mounted with respect to the base portion 28 of the housing 29 whereby to provide for the hereinbefore-described controllable forcible lateral displacement of the solder guide means 32 from the solid line outer position shown in FIG. 11 into the broken line inner solder-feeding position shown in FIG. 11. In the specific example illustrated, this is provided by the housing 29 including said movable top or outer portion, indicated generally at 59, which is pivoted with respect to the base portion 28 by pivot pin means 61 (best shown in FIG. 1) so that the forward end of said top or outer housing portion 59 can be forcibly moved from the outer position shown in solid lines in FIG. 11 into the inner position shown in broken lines in FIG. 11. When manual force is removed, said top or outer housing portion 59 will return to the normal outer displaced position under the action of biasing spring means 62 which normally biases said upper housing portion 59, the solder guide means 32 carried thereby, and the solder-advancing means 31 carried thereby into said maximum outwardly displaced relationship with respect to the base means 28 of the housing 29.

As pointed out above, when manually inwardly directed force is removed from said top or outer housing portion 59 and said biasing spring means 62 is allowed to return it to its normal pre-operated or pre-operative position as shown in solid lines in FIG. 11 and fragmentarily in FIG. 6, the solder-advancement or solder-advancing means 31 is also returned to its pre-operated or pre-operative position under the action of a return biasing spring means 48. During this return movement the engagement tooth means 45 becomes effectively pivotally disengaged from the length of solder 43 so that no rearward movement of said length of solder 43 occurs.

In other words, it can be said that the above-described solder-advancing action and the reverse disengaging movement of the elements of said solder-advancing means 31 are brought about by effective forcible movement of operating means, such as the operating lever means 47, which is adapted to be forcibly moved from the position shown in FIG. 7 during forcible inward movement of the top or outer housing portion 59 as described hereinbefore, and which is adapted to return to its former position, as shown in FIG. 6, upon removal of said inwardly directed manual force holding said top or outer housing portion 59 in the inwardly displaced position shown in FIG. 7.

The operating means 47 effectively operates the solder-advancing means 31 by way of coupling means, indicated generally at 49 (see FIG. 2), operative to effectively couple said operating lever means 47 with respect to said slide means 44 and with respect to the engagement tooth means 45.

In the form illustrated, said coupling means 49 includes an upstanding member 51 which is pivotally mounted as indicated at 52, adjacent to the rear end of said slide means 44 and which is pivotally provided, as indicated at 53, with a forwardly directed member 54 pivotally connected, as indicated at 55, to the upper end of said engagement tooth means 45, which is pivotally mounted, as indicated at 56, therebelow with respect to a forward portion of said slide means 44.

Said coupling means 49 also includes a linkage bar 57 pivotally connected between a lower lever portion 58 of said operating lever means 47 and said pivot point 53 at the top of said upstanding member 51, thus providing an arrangement whereby forward operation of the lower lever arm portion 58 of the operating lever means 47 will forwardly pull said linkage bar 57 and forwardly pivot the upper end of said upstanding member 51 whereby to forwardly move said forwardly directed member 54 and pivotally move said engagement tooth means 45 into said engagement position (previously described), for engaging the length of solder 43 and forwardly moving same (see FIG. 7).

The above-described forward operation (or movement) of the lower lever arm portion 58 of the operating lever means 47 is brought about by the forcible inward movement thereof against cam means 63 carried by the base portion 28 of the housing 29 whenever the top or outer housing portion 59 is forcibly manually moved inwardly from the position shown in FIG. 6, into the inner position shown in FIG. 7. Of course, outward movement of said top or outer housing portion 59 under the action of the biasing spring 62 will allow the biasing spring 48 to return the operating lever means 47 to its pre-operated position and will reverse the movement of the various parts associated therewith and will cause the engagement tooth means 45 to become disengaged from the length of solder 43 and to be moved toward the right into the normal disengaged position as shown in FIG. 6.

The above-described solder-feeding operation will cause the forward end 43F of the length of solder 43 to extend toward the heated soldering iron tip 39 for melting and effective soldering use. The slidable movement of the slide means 44 is provided, in the exemplary form of the invention illustrated, by the encompassing engagement of the hollow tubular portion 44T of the slide means around the exterior of the corresponding portion of the solder guide tube 33. However, various other suitable slidable mounting arrangements may be provided and are intended to be included and comprehended within the broad scope of the invention.

It should be noted that while the exemplary form of the invention which has been described hereinbefore shows the solder-advancing means 31 mounted in the movable upper or outer housing portion 59 in a manner such that the solder-advancing operation is effected by the cam means 63 in response to inward movement of the solder-dispensing tip 38 into the broken line position of FIG. 11, the invention is not intended to be specifically so limited. Actually, various other operating means may be employed. For example, a very slight rearrangement of the operating lever means 47 so that its pivotal mounting is lower and is carried in a fixed relationship with respect to the base portion 28 of the housing 29 and so that its upper portion is effectively provided with a cammed surface part lying inside of the upper or outer housing portion 59 and adjacent thereto for slidable abutting camming operation thereof in response to inward movement of the solder-dispensing tip 38, will cause the two operations to be effectively performed in a coupled manner functionally equivalent to the arrangement described in detail hereinafter. Also, various other equivalent arrangements may be employed in lieu thereof. One such exemplary modified arrangement is disclosed in FIG. 12 and variations thereof are shown in FIGS. 13 and 14, and will be described in detail hereinafter.

FIG. 12 illustrates a further modification of the invention and similar portions are indicated by similar reference numerals, primed, however. In this modification, the solder-advancing means, indicated generally at 31', comprises a mounting member 44' somewhat similar to the member 44 of the first form of the invention but which has connected thereto an operating coupling arm 64 pivotally mounted as indicated at 65 at its rear end at a predetermined location with respect to said member 44' and having a forward arcuately movable pivotal connection end 66 pivotally connected to the rear end of a downwardly angularly forwardly inclined engagement tooth means 45' and normally being misaligned therewith and held in such relationship under the action of biasing spring means 48' but cooperable for forced movement toward an aligned relationship with respect thereto in response to the operation of operating means 47' as a result of movement of the upper or outer housing portion 59' inwardly toward the base housing portion 28'. In the modified arrangement illustrated, the operating means 47' has a lower end 58' which is cooperable with a cam portion 63' in the same manner as the earlier form of the invention such that inward movement of said upper or outer housing portion 59' will force said coupling arm 64 and said engagement tooth means 45' toward an aligned relationship which will effectively move the forward end of said engagement tooth means 45' into engaged position with respect to a length of solder for advancing same in a general manner similar to that described hereinbefore. This modified form of the invention also has a modified form of return spring 62'.

FIG. 13 illustrates a further slight variation of the modification shown fragmentarily in FIG. 12, and similar parts are indicated by similar reference numerals, doubly primed, however. In this slight variation, the operating means 47" extends upwardly and through an aperture 67 in the upper or outer housing portion 59" into a position exterior thereof for manual operation simultaneously with the forcible inward movement of the entire upper or outer housing portion 59", although independent operation thereof is also possible, if desired. Also, this variation may include a secondary outer housing portion shown at 59S" in phantom in FIG. 11 which would cover the modified operating means 47" so that it would be within said secondary outer housing portion 59S" and would be operated by inward pivotal movement thereof.

In addition to variations of the solder-advancing means 31 and the means for movably mounting the solder guide means 32 and to various modifications of the means for coupling same, it should also be noted that the attachment means may be of the modified type indicated generally at 22' in FIG. 12 or 22" in FIG. 13 or may be of a type fastened in an essentially non-removable manner with respect to a soldering iron handle at the factory so that the complete unit is supplied in mounted relationship with respect to a soldering iron. This variation of the invention may be in a form where said unit is non-removable with respect to the soldering iron, if desired, and may be made in any suitable manner.

FIG. 14 illustrates a further modification of the invention and similar portions are indicated by similar reference numerals, triply primed, however. In this modification, the solder-advancing means, indicated generally at 31''', comprises a mounting member 44''' somewhat similar to the member 44 of the first form of the invention, although it is on the opposite side of the solder guide tube 33''' from any of the earlier forms of the invention described hereinbefore. This is also true of the operating coupling arm 64''' and the angularly forwardly inclined engagement tooth means 45'''—all of which are actually positioned between the solder guide tube 33''' and the bottom wall of the fixed base portion 28''' of the housing means generally indicated at 29'''. The rear end of the operating coupling arm 64''' is pivotally mounted as indicated at 65''' at a predetermined location with respect to said member 44''' and has a forward arcuately movable pivotal connection end 66''' pivotally connected to the rear end of the upwardly angularly forwardly inclined engagement tooth means 45''' and is normally misaligned therewith and held in such relationship under the action of biasing spring means 48''' but is cooperable for forced movement toward an aligned relationship with respect thereto in response to the operation of the operating means (which can be said to actually comprise the pivotal junction 66''' of the coupling arm 64''' and the engagement tooth 45''' and which is generally indicated at 47''') as a result of movement of the upper or outer housing portion 59''' downwardly or inwardly toward the base housing portion 28'''. The operation of this modified form of the invention is quite similar to the form illustrated in FIG. 13 except for the positional reversal of the coupling arm 64''' and the engagement tooth 45''' which makes possible the elimination of the projecting lever comprising the operating means 47" of the form of the invention illustrated in FIG. 13 and also which makes possible the elimination of the secondary outer housing portion shown at 59S" in FIG. 13. Otherwise, this modification of the invention operates very much the same as the form shown in FIG. 13.

FIGS. 15 and 16 illustrate a further modification of the invention, and functionally similar parts are indicated by similar reference numerals, followed by the letter, $a$, however. In this modification, the solder-advancing means, indicated generally at 31a, comprises a mounting member or attachment means 44a, somewhat similar to the mounting member 44''' of the form of the invention shown in FIG. 14, which firmly mounts and attaches the operating means generally indicated at 47a. It should be noted that, in this modified form, said operating means 47a effectively comprises a longitudinally curved laterally bendable spring member having a forward portion 67 effectively provided with upwardly angularly forwardly inclined engagement tooth means 45a similar to the engagement tooth means 45''' of the form of the invention illustrated in FIG. 14, said spring member comprising said operting means 47a also having a rear portion 68 effectively provided with the previously mentioned mounting member or attachment means 44a, and said operating means taking the form of said spring member 47a also having an intermediate curved abutment portion 69 displaced from said forward and rear portions 67 and 68 toward the bottom wall of the fixed base portion 28a, which corresponds to the base portion 28''' of the form of the invention illustrated in FIG. 14. It will be noted that said intermediate curved abutment portion 69 is cooperable for spring-elongating abutment with said base portion 28a when the entire solder guide means 32a and the upper or outer housing portion 59a are moved toward the base housing portion 28a. When this occurs, the intermediate curved abutment portion 69 of the spring member comprising the operating means 47a will be effectively flattened in a manner which will effectively elongate same whereby to forcibly move the engagement tooth means 45a upwardly and toward the left as seen in FIG. 15 into an engaged position for engaging and forwardly moving a length of solder, such as is designated at 43a, which is carried within the solder guide aperture of the solder guide means 32a. If desired, in certain forms of the invention, said engagement tooth means 45a may be serrated or otherwise modified in order to incease its engagement characteristic.

In the exemplary modified form of the invention illustrated in FIGS. 15 and 16, the curved displaced intermediate abutment portion 69 of the spring member comprising the operating means 47a may also be said to effectively comprise return biasing spring means cooperable with respect to the solder guide means 32a and fixed base portion 28a for returning said solder guide means 32a to its pre-operated position, such as shown in FIG. 15, and for simultaneously returning said angularly forwardly inclined engagement tooth means into its normal effectively disengaged or inoperative position.

It should also be noted that, in the modified exemplary form of the invention illustrated in FIGS. 15 and 16, the solder guide means 32a is provided with one-way engagement means effectively positioned for cooperation with the length of solder 43a adapted to be carried within the solder guide aperture of the solder guide means 32a for normally preventing retraction movement of said solder 43a while freely allowing advancing movement thereof. One exemplary form of said one-way engagement means is designated by the reference numeral 71 and comprises a folded back end portion of the spring member forming the operating means 47a which is held by the mounting member or attachment means 44a along with the rest of the spring member comprising the operating means 47a in a manner such as to normally extend through an opening 72 in the solder guide means 32a so as to be in sharply angularly forwardly inclined engagement with the length of solder 43a, which will freely allow advancing movement thereof but which will dig into same and positively prevent retracting movement thereof. This illustrates one exemplary form of such a one-way engagement means, but it is to be clearly understood that certain modifications thereof are intended to be included and comprehended within the broad scope of the present invention and that, in certain forms of the invention, said member 71 may be dispensed with and the engagement tooth 45a may be so angularly inclined and positioned as to function for similar retraction-preventing purposes with respect to the length of solder 43a.

In the exemplary modified form of the invention illustrated in FIGS. 15 and 16, the rear folded-over end portion 68 of the spring member forming the operating means 45a and also forming the one-way engagement means 71 is forcibly press-fit or received within a mounting recess 73 carried in the mounting member 44a, which is fastened by mounting screws 74 to upper members 75 firmly mounted on each side of the solder guide tube 33a. This comprises one effective type of attachment means. However, this arrangement may be modified within the broad scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A solder-feeding apparatus for a soldering iron, comprising: longitudinally apertured solder guide means defining a longitudinal guide aperture therethrough adapted to receive and guide a length of solder therealong, said solder guide means having a rear entry end provided with a rear entry opening communicating with said guide aperture at the rear end thereof and having a forwardly positioned angularly forwardly and laterally directed dispensing tip end provided with an exit opening communicating with said guide aperture, at least a portion of said solder guide means being provided with access opening means providing access to at least one side of said longitudinal solder guide aperture means; effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; and biasing spring means normally biasing said solder guide means outwardly away from said base portion so as to place said forward dispensing tip end of said solder guide means in said laterally displaced relationship with respect to the forward tip end of the soldering iron; said solder-advancing means comprising an angularly forwardly inclined engagement tooth means positioned adjacent to said access opening means, said operating means being effectively provided with coupling means effectively coupling said operating means with respect to said angularly forwardly inclined engagement tooth means for effectively pivotally moving said engagement tooth means from a first disengaged position with respect to a portion of a length of solder adapted to lie in said guide aperture at the region of said access opening means into a second engaged position with respect thereto in response to operation of said operating means coincident with forcible manual inward movement of said solder guide means toward said base portion of said soldering iron tip whereby to move said forward end of said engagement tooth means into said engaged position for engaging and forwardly moving a length of solder adapted to be carried within said solder guide aperture.

2. A solder-feeding apparatus for a soldering iron, comprising: longitudinally apertured solder guide means defining a longitudinal guide aperture therethrough adapted to receive and guide a length of solder therealong, said solder guide means having a rear entry end provided with a rear entry opening communicating with said guide aperture at the rear end thereof and having a forwardly positioned angularly forwardly and laterally directed dispensing tip end provided with an exit opening communicating with said guide aperture, at least a portion of said solder guide means being provided with access opening means providing access to at least one side of said longitudinal solder guide aperture means; effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; and biasing spring means normally biasing said solder guide means outwardly away from said base portion so as to place said forward dispensing tip end of said solder guide means in said laterally displaced relationship with respect to the forward tip end of the soldering iron; said solder-advancing means comprising a longitudinal slide means effectively slidably mounted with respect to a portion of said longitudinal solder guide means rearwardly adjacent to said access opening means and provided with angularly forwardly inclined engagement tooth means pivotally mounted with respect thereto for movement between a disengaged position with respect to a portion of a length of solder adapted to lie in said guide aperture at the region of said access opening means and a second engaged position with respect thereto, said operating means effectively comprising lever means positioned for forcible operation in response to inward movement of said solder guide means and effectively provided with coupling means coupling same with respect to said slide means for forcibly forwardly sliding same, said coupling means also effectively coupling said operating means with respect to said engagement tooth means for pivoting it into said engaged position when said slide means is forcibly forwardly slidably moved by forcible manual inward movement of said solder guide means toward said base portion and said soldering iron tip whereby to be adapted to engage and forwardly move a length of solder adapted to be carried within said solder guide aperture.

3. A solder-feeding apparatus for a soldering iron, comprising: longitudinally apertured solder guide means defining a longitudinal guide aperture therethrough adapted to receive and guide a length of solder therealong, said solder guide means having a rear entry end provided with a rear entry opening communicating with said guide aperture at the rear end thereof and having a forwardly positioned angularly forwardly and laterally directed dispensing tip end provided with an exit opening communicating with said guide aperture, at least a portion of said solder guide means being provided with access opening means providing access to at least one side of said longitudinal solder guide aperture means; effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; and biasing spring means normally biasing said solder guide means outwardly away from said base portion so as to place said forward dispensing tip end of said solder guide means in said laterally displaced relationship with respect to the forward tip end of the soldering iron; said solder-advancing means comprising a longitudinal slide means effectively slidably mounted with respect to a portion of said longitudinal solder guide means rearwardly adjacent to said access opening means and provided with angularly forwardly inclined engagement tooth means pivotally mounted with respect thereto for movement between a disengaged position with respect to a portion of a length of solder adapted to lie in said guide aperture at the region of said access opening means and a second engaged position with respect thereto, said operating means effectively comprising lever means positioned for forcible operation in response to inward movement of said solder guide means and effectively provided with coupling means coupling same with respect to said slide means for forcibly forwardly sliding same, said coupling means also effectively coupling said operating means with respect to said engagement tooth means for pivoting it into said engaged position when said slide means is forcibly forwardly slidably moved by forcible manual inward movement of said solder guide means toward said base portion and said soldering iron tip whereby to be adapted to engage and forwardly move a length of solder adapted to be carried within said solder guide aperture, said operating means being effectively provided with return biasing spring means effectively cooperable with respect thereto for returning said operating means to its pre-operated position and for simultaneously returning said slide means to its pre-operated rearward position while simultaneously returning said engagement tooth means to said disengaged position.

4. A solder-feeding apparatus for a soldering iron, comprising: longitudinally apertured solder guide means defining a longitudinal guide aperture therethrough adapted to receive and guide a length of solder therealong, said solder guide means having a rear entry end provided with a rear entry opening communicating with said guide aperture at the rear end thereof and having a forwardly positioned angularly forwardly and laterally directed dispensing tip end provided with an exit opening communicating with said guide aperture, at least a portion of said solder guide means being provided with access opening means providing access to at least one side of said longitudinal solder guide aperture means; effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; and biasing spring means normally biasing said solder guide means outwardly away from said base portion so as to place said forward dispensing tip end of said solder guide means in said laterally displaced relationship with respect to the forward tip end of the soldering iron; said solder-advancing means comprising a longitudinal slide means effectively slidably mounted with respect to a portion of said longitudinal solder guide means rearwardly adjacent to said access opening means and provided with angularly forwardly inclined engagement tooth means pivotally mounted with respect thereto for movement between a disengaged position with respect to a portion of a length of solder adapted to lie in said guide aperture at the region of said access opening means and a second engaged position with respect thereto, said operating means effectively comprising lever means positioned for forcible operation in response to inward movement of said solder guide means and effectively provided with coupling means coupling same with respect to said slide means for forcibly forwardly sliding same, said coupling means also effectively coupling said operating means with respect to said engagement tooth means for pivoting it into said engaged position when said slide means is forcibly forwardly slidably moved by forcible manual inward movement of said solder guide means toward said base portion and said soldering iron tip whereby to be adapted to engage and forwardly move a length of solder adapted to be carried within said solder guide aperture, said coupling means including an upstanding pivotally mounted member carried adjacent to the rear end of said slide means and provided with a forwardly directed member pivotally connected to an upper end of said engagement tooth means, which is pivotally mounted therebelow with respect to a forward portion of said slide means, said coupling means also including a linkage bar connected between said operating means and said upstanding member above its pivotal connection point with respect to said rear end of said slide means whereby forward operation of the portion of said operating means connected to said linkage bar will forwardly pivot the upper end of said upstanding member, forwardly move said forwardly directed member, and pivotally move said engagement tooth means into said engaged position for engagement with a corresponding portion of the length of solder, and whereby the reverse movement of said operating means will reverse the movements of said parts and cause said engagement tooth means to move into said disengaged position.

5. Apparatus as defined in claim 1, wherein said base portion is provided with controllably disengageable attachment means for controllably disengageable mounting attachment with respect to a handle of said soldering iron.

6. A solder-feeding apparatus for a soldering iron, comprising: longitudinally apertured solder guide means defining a longitudinal guide aperture therethrough adapted to receive and guide a length of solder therealong, said solder guide means having a rear entry end provided with a rear entry opening communicating with said guide aperture at the rear end thereof and having a forwardly positioned angularly forwardly and laterally directed dispensing tip end provided with an exit opening communicating with said guide aperture, at least a portion of said solder guide means being provided with access opening means providing access to at least one side of said longitudinal solder guide aperture means; effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; and biasing spring means normally biasing said solder guide means outwardly away from said base portion so as to place said forward dispensing tip end of said solder guide means in said laterally displaced relationship with respect to the forward tip end of the soldering iron; said solder-advancing means comprising an angularly forwardly inclined engagement tooth means positioned adjacent to said access opening means, said operating means being effectively provided with coupling means comprising a coupling arm pivotally mounted adjacent to its rear end at a predetermined location with respect to said solder guide means and having a forward arcuately movable pivotal connection end pivotally connected to the rear end of said angularly forwardly inclined engagement tooth means and normally being misaligned with respect thereto and cooperable for movement toward an aligned relationship with respect thereto in response to operation of said operating means as a result of movement of said solder guide means toward said base portion whereby to move the forward end of said engagement tooth means into an engaged position for engaging and forwardly moving a length of solder adapted to be carried within said solder guide aperture.

7. A solder-feeding apparatus for a soldering iron, comprising: longitudinally apertured solder guide means defining a longitudinal guide aperture therethrough adapted to receive and guide a length of solder therealong, said solder guide means having a rear entry end provided with a rear entry opening communicating with said guide aperture at the rear end thereof and having a forwardly positioned angularly forwardly and laterally directed dispensing tip end provided with an exit opening communicating with said guide aperture, at least a portion of said solder guide means being provided with access opening means providing access to at least one side of said longitudinal solder guide aperture means; effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; and biasing spring means normally biasing said solder guide means outwardly away from said base portion so as to place said forward dispensing tip end of said solder guide means in said laterally displaced relationship with respect to the forward tip end of the soldering iron; said solder-advancing means comprising an angularly forwardly inclined engagement tooth means positioned adjacent to said access opening means, said operating means being effectively provided with coupling means comprising a coupling arm pivotally mounted adjacent to its rear end at a predetermined location with respect to said solder guide means and having a forward arcuately movable pivotal connection end pivotally connected to the rear end of said angularly forwardly inclined engagement tooth means and normally being misaligned with respect thereto and cooperable for movement toward an aligned relationship with respect thereto in response to operation of said operating means as a result of movement of said solder guide means toward said base portion whereby to move the forward end of said engagement tooth means into an engaged position for engaging and forwardly moving a length of solder adapted to be carried within said solder guide aperture, said operating means being effectively provided with return biasing spring means effectively cooperable with respect thereto for returning said operating means to its pre-operated position and for simultaneously returning said coupling arm and said engagement tooth means into their pre-operated effectively misaligned relationship with said engagement tooth means being in said disengaged position.

8. A solder-feeding apparatus for a soldering iron, comprising: longitudinally apertured solder guide means defining a longitudinal guide aperture therethrough adapted to receive and guide a length of solder therealong, said solder guide means having an entry opening at the rear end thereof communicating with said guide aperture and having an exit opening at a forward dispensing tip end thereof communicating with said guide aperture, at least a portion of said solder guide means being provided with access opening means providing access to at least one side of said longitudinal solder guide aperture means; and effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; said solder-advancing means comprising an angularly forwardly inclined engagement tooth means positioned adjacent to said access opening means, said operating means effectively comprising a longitudinally curved laterally bendable spring member having a forward portion effectively provided with said engagement tooth means at its forward end, having a rear portion effectively provided with attachment means attaching same with respect to said solder guide means, and having an intermediate curved abutment portion displaced from said forward and rear portions toward said base portion and cooperable for spring-elongating abutment with said base portion when said solder guide means is manually forcibly moved toward said base portion whereby to forcibly move said engagement tooth means into an engaged position for engaging and forwardly moving a length of solder adapted to be carried within said solder guide aperture of said solder guide means.

9. A solder-feeding apparatus for a soldering iron, comprising: longitudinally apertured solder guide means defining a longitudinal guide aperture therethrough adapted to receive and guide a length of solder therealong, said solder guide means having an entry opening at the rear end thereof communicating with said guide aperture and having an exit opening at a forward dispensing tip end thereof communicating with said guide aperture, at least a portion of said solder guide means being provided with access opening means providing access to at least one side of said longitudinal solder guide means; and effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; said solder-advancing means comprising an angularly forwardly inclined engagement tooth means positioned adjacent to said access opening means, said operating means effectively comprising a longitudinally curved laterally bendable spring member having a forward portion effectively provided with said engagement tooth means at its forward end, having a rear portion effectively provided with attachment means attaching same with respect to said solder guide means, and having an intermediate curved abutment portion displaced from said forward and rear portions toward said base portion and cooperable for spring-elongating abutment with said base portion when said solder guide means is manually forcibly moved toward said base portion whereby to forcibly move said engagement tooth means into an engaged position for engaging and forwardly moving a length of solder adapted to be carried within said solder guide aperture of said solder guide means, said displaced intermediate curved abutment portion of said spring member effectively comprising return biasing spring means cooperable with respect to said solder guide means and said base portion for returning said solder guide means to its pre-operated position and for simultaneously returning said angularly forwardly inclined engagement tooth means into its initial pre-operated position.

10. A solder-feeding apparatus for a soldering iron, comprising: longitudinally apertured solder guide means defining a longitudinal guide aperture therethrough adapted to receive and guide a length of solder therealong, said solder guide means having an entry opening at the rear end thereof communicating with said guide aperture and having an exit opening at a forward dispensing tip end thereof communicating with said guide aperture, at least a portion of said solder guide means being provided with access opening means providing access to at least one side of said longitudinal solder guide aperture means; and effectively controllably operable solder-advancing means movably mounted adjacent to said access opening means for controlled intermittent advancing engagement, by way of said access opening means, with respect to a corresponding portion of a length of solder adapted to be carried within said longitudinal solder guide aperture; said solder guide means being effectively provided with, and being movably mounted with respect to, a base portion adapted to be connected to a soldering iron and carrying said forward dispensing tip end of said solder guide means in a position transversely displaced from a forward tip end of the soldering iron whereby to provide for controlled movement thereof toward said forward tip end of said soldering iron when the solder-advancing means is to be effectively controllably operated to dispense a desired quantity of solder from said forward dispensing tip end of said solder guide means for use in performing a soldering operation by the closely adjacent soldering iron tip end; said solder-advancing means being effectively provided with operating means positioned for controllable forcible engagement and operation thereof by said solder guide means when said solder guide means is controllably manually moved toward said base portion for moving said forward dispensing tip end of said solder guide means into said closely adjacent dispensing relationship with respect to said soldering iron tip end; said solder-advancing means comprising an angularly forwardly inclined engagement tooth means positioned adjacent to said access opening means, said operating means effectively comprising a longitudinally curved laterally bendable spring member having a forward portion effectively provided with said engagement tooth means at its forward end, having a rear portion effectively provided with attachment means attaching same with respect to said solder guide means, and having an intermediate curved abutment portion displaced from said forward and rear portions toward said base portion and cooperable for spring-elongating abutment with said base portion when solder guide means is manually forcibly moved toward said base portion whereby to forcibly move said engagement tooth means into an engaged position for engaging and forwardly moving a length of solder adapted to be carried within said solder guide aperture of said solder guide means, said displaced intermediate curved abutment portion of said spring member effectively comprising return biasing spring means cooperable with respect to said solder guide means and said base portion for returning said solder guide means to its pre-operated position and for simultaneously returning said angularly forwardly inclined engagement tooth means into its initial pre-operated position, said solder guide means being provided with one-way engagement means effectively positioned for cooperation with said length of solder adapted to be carried within said solder guide aperture of said solder guide means for normally preventing retracting movement thereof while freely allowing advancing movement thereof.

References Cited by the Examiner
UNITED STATES PATENTS
2,313,947  12/1942  Moore _____ 226—128
FOREIGN PATENTS
463,141  3/1937  Great Britain.

WHITMORE A. WILTZ, *Primary Examiner.*

M. L. FAIGUS, *Assistant Examiner.*